(12) United States Patent
Sharma et al.

(10) Patent No.: US 9,110,806 B2
(45) Date of Patent: Aug. 18, 2015

(54) OPPORTUNISTIC PAGE CACHING FOR VIRTUALIZED SERVERS

(75) Inventors: Parag Sharma, Issaquah, WA (US);
Ripal Babubhai Nathuji, Bothell, WA (US); Mehmet Iyigun, Kirkland, WA (US); Yevgeniy M. Bak, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 474 days.

(21) Appl. No.: 12/720,684

(22) Filed: Mar. 10, 2010

(65) Prior Publication Data

US 2011/0225342 A1    Sep. 15, 2011

(51) Int. Cl.
*G06F 12/00* (2006.01)
*G06F 12/08* (2006.01)

(52) U.S. Cl.
CPC ............ *G06F 12/08* (2013.01); *G06F 12/0842* (2013.01); *G06F 2212/656* (2013.01)

(58) Field of Classification Search
None
See application file for complete search history.

(56) References Cited

U.S. PATENT DOCUMENTS

| | | | |
|---|---|---|---|
| 7,930,483 B2 * | 4/2011 | Borkenhagen | 711/118 |
| 2004/0215668 A1 * | 10/2004 | Sun | 707/201 |
| 2005/0132122 A1 * | 6/2005 | Rozas | 711/100 |
| 2009/0006801 A1 | 1/2009 | Shultz et al. | |
| 2009/0307432 A1 | 12/2009 | Fleming | |
| 2009/0328074 A1 | 12/2009 | Oshins | |
| 2010/0088474 A1 * | 4/2010 | Agesen | 711/147 |
| 2010/0223432 A1 * | 9/2010 | Eidus et al. | 711/148 |

OTHER PUBLICATIONS

Lu, et. al., "Virtual Machine Memory Access Tracing with Hypervisor Exclusive Cache", Retrieved at<<http://www.cs.rochester.edu/~kshen/papers/usenix2007-lu.pdf>>, 2007, pp. 1-15.
Mangenheimer, Dan, "Memory Overcommit . . . Without the Commitment", Retrieved at<<http://wiki.xensource.com/xenwiki/Open_Topics_For_Discussion?action=AttachFile&do=get&target=Memory+Overcommit.pdf>>, Jun. 2008, pp. 1-3.
Magenheimer, et al., "Transcendent Memory: Re-inventing Physical Memory Management in a Virtualized Environment", Retrieved at<<http://oss.oracle.com/projects/tmem/dist/documentation/papers/tmemOSDI08WIP.pdf>>, Nov. 16, 2008, p. 1.
Jeon, et al., "Domain Level Page Sharing in Xen Virtual Machine Systems", Retrieved at<<http://sigcs.kaist.ac.kr/home/uploads/CALab/appt07.pdf>>, Jan. 8, 2010, pp. 1-10.
Gupta, et al., "Difference Engine: Harnessing Memory Redundancy in Virtual Machines", Retrieved at<<http://www.usenix.org/events/osdi08/tech/full_papers/gupta/gupta.pdf>>, 8th USENIX Symposium on Operating Systems Design and Implementation, Jan. 8, 2010, pp. 309-322.

(Continued)

*Primary Examiner* — Cheng-Yuan Tseng
*Assistant Examiner* — Daniel Tsui
(74) *Attorney, Agent, or Firm* — Judy Yee; Micky Minhas

(57) ABSTRACT

A system described herein includes a receiver component that receives an indication that at least one page in virtual memory is free and the at least one page in virtual memory is classified as short-lived memory, wherein the virtual memory is accessible to at least one virtual machine executing on a computing device. The system also includes a cache updater component that dynamically updates a cache to include the at least one page, wherein the cache is accessible to the at least one virtual machine.

20 Claims, 6 Drawing Sheets

(56) References Cited

OTHER PUBLICATIONS

"Understanding Memory Resource Management in VMware® ESX™ Server", Retrieved at<<http://www.vmware.com/files/pdf/perf-vsphere-memory_management.pdf>>22, Jan. 8, 2010, pp. 1-20.
Magenheimer, et al., "Paravirtualized Paging"., Retrieved at <<http://www.usenix.org/event/wiov08/tech/full_papers/magenheimer/magenheimer.pdf>>, Oct. 31, 2008, pp. 1-6.
Schwidefsky, et al., "Collaborative Memory Management in Hosted Linux Systems", Retrieved at <<http://www.linuxsymposium.org/2006/cmm_slides.pdf>>, 2006, pp. 1-23.
Barham, et al., "Xen and the Art of Virtualization", Retrieved at<<http://www.cl.cam.ac.uk/research/srg/netos/papers/2003-xensosp.pdf>>, Proceedings of the nineteenth ACM symposium on Operating systems principles, Oct. 19-22, 2003, pp. 1-14.
Chen, et al., "Energy-Aware Server Provisioning and Load Dispatching for Connection-Intensive Internet Services", Retrieved at <<http://research.microsoft.com/pubs/76111/provisioning-nsdi08.pdf>>, Proceedings of the 5th USENIX Symposium on Networked Systems Design and Implementation>>, Apr. 16-18, 2008, pp. 1-14.
Clark, et al., "Live Migration of Virtual Machines", Retrieved at <<http://www.cl.cam.ac.uk/research/srg/netos/papers/2005-migration-nsdi-pre.pdf>>, Proceedings of the 2nd conference on Symposium on Networked Systems Design & Implementation, vol. 2, May 2-4, 2005, pp. 273-286.
Henning L. John, "SPEC CPU2006 Benchmark Descriptions", Retrieved at <<http://portal.acm.org/citation.cfm?id=1186737>>, ACM SIGARCH Computer Architecture News, vol. 34, No. 4, Sep. 2006, pp. 1-17.
Heo, et al., "Memory Overbooking and Dynamic Control of Xen Virtual Machines in Consolidated Environments", Retrieved at <<http://www.cs.uiuc.edu/homes/jinheo/papers/IM2009-final.pdf>>, Proceedings of the 11th IFIP/IEEE international conference on Symposium on Integrated Network Management, Jun. 1-5, 2009, pp. 1-8.
Herminer, et al., "Entropy: a ConsolidationManager for Clusters", Retrieved at <<http://delivery.acm.org/10.1145/1510000/1508300/p41-hermenier.pdf?key1=1508300&key2=1606408621&coll=GUIDE&dl=GUIDE&CFID=79132120&CFTOKEN=27554132>>, In proceedings of the 2009 International Conference on Virtual Execution Environments (VEE'09), Mar. 2009, pp. 1-10.
Khanna, et al., "Application Performance Management in Virtualized Server Environments", Retrieved at <<http://scholar.google.com/scholar?q=%22Application+Performance+Management+in+Virtualized+Server+Environments.%22>>, In the proceedings of the 10th IEEE/IFIP In Network Operations and Management Symposium, 2006, pp. 373-381.
Lim, et al., "Disaggregated Memory for Expansion and Sharing in Blade Servers", Retrieved at <<http://www.eecs.umich.edu/~twenisch/papers/isca09-disaggregate.pdf>>, ACM SIGARCH Computer Architecture News, vol. 37, No. 3, Jun. 2009, pp. 1-12.
Magenheimer, Dan, "Transcendent Memory on Linux", Retrieved at <<http://www.linuxsymposium.org/2009/speakers.php?types=TALK>>, Linux Symposium, Jul. 13-17, 2009, pp. 1-67.
Milos, et al., "Satori: Enlightened page sharing", Retrieved at <<http://www.xen.org/files/xensummit_oracle09/xensummit_satori.pdf>>, in USENIX Annual Technical Conference, 2009, pp. 1-14.
Nathuji, et al., "VirtualPower: Coordinated Power Management in Virtualized Enterprise Systems", Retrieved at <<http://www.sosp2007.org/papers/sosp111-nathuji.pdf>>, In the proceedings of twenty-first ACM SIGOPS symposium on Operating systems principles, Oct. 14-17, 2007, pp. 1-14.
Padala, et al., "Automated Control of Multiple Virtualized Resources" Retrieved <<http://www.hpl.hp.com/techreports/2008/HPL-2008-123R1.pdf>>, Nov. 21, 2008, pp. 1-17.
Padala, et al., "Adaptive Control of Virtualized Resources in Utility Computing Environments", Retrieved at <<http://www.eecs.umich.edu/~ppadala/research/dyncontrol/eurosys07.pdf>>, Proceedings of the 2nd ACM SIGOPS/EuroSys European Conference on Computer Systems 2007, Mar. 21-23, 2007, pp. 1-14.
Schopp, et al., "Resizing Memory With Balloons and Hotplug", Retrieved at <<http://www.kernel.org/doc/ols/2006/ols2006v2-pages-313-320.pdf>>, Proceedings of the Linux Symposium, vol. 2, 2006, pp. 1-10.
"SPEC CPU2006", Retrieved at <<http://www.spec.org/cpu2006/>>, Aug. 18, 2008, pp. 1-2.
Stoess, et al., "Energy Management for Hypervisor-Based Virtual Machines" Retrieved at <<http://i30www.ira.uka.de/research/documents/pm/2007/stoess07energymgmtvms.pdf>>, In USENIX Annual Technical Conference on Proceedings of the USENIX Annual Technical Conference, Jun. 17-22, 2007, pp. 1-14.
Tolia, et al., "Delivering Energy Proportionality with Non Energy-Proportional Systems—Optimizing the Ensemble", Retrieved at <<http://www.usenix.org/events/hotpower08/tech/full_papers/tolia/tolia.pdf>>, In HotPower '08: Workshop on Power Aware Computing and Systems, Dec. 7, 2008, pp. 1-5.
"VMware vSphere", Retrieved at <<http://www.vmware.com/products/esx/>22, Mar. 4, 2010, pp. 1-4.
Waldspurger, Carl A., "Memory Resource Management in VMware ESX Server", <<In Proceedings of the Fifth Symposium on Operating Systems Design and Implementation (OSDI '02), vol. 36, No. SI, Dec. 2002, pp. 1-14.
"Windows Server 2008 R2: Virtualization with Hyper-V'", Retrieved at <<http://www.microsoft.com/windowsserver2008/en/us/hyperv-main.aspx>>, Mar. 4, 2010, pp. 1-2.
Wood, et al., "Memory Buddies: Exploiting Page Sharing for Smart Colocation in Virtualized Data Centers", Retrieved at <<http://lass.cs.umass.edu/papers/pdf/VEE09-membuds.pdf>>, Proceedings of the 2009 ACM SIGPLAN/SIGOPS international conference on Virtual execution environments, Mar. 11-13, 2009, pp. 1-10.
Zhao, et al., "Dynamic Memory Balancing for Virtual Machines", Retrieved at <<http://www.cs.mtu.edu/~wezhao/papers/vee09.pdf>>, Proceedings of the 2009 ACM SIGPLAN/SIGOPS international conference on Virtual execution environments, Mar. 11-13, 2009, pp. 1-10.

\* cited by examiner

OPPORTUNISTIC PAGE CACHING FOR VIRTUALIZED SERVERS

BACKGROUND

Virtualization refers to the hiding of physical characteristics of a computing platform from users and instead showing the users another computing platform that is abstracted from the physical characteristics. Generally, platform virtualization is performed on a given hardware platform by host software, which is often referred to as a root virtual machine. This root virtual machine can create a simulated computer environment for guest programs, which are often referred to as child virtual machines. These child virtual machines may be applications, complete operating systems, etc.

Virtualization is quickly emerging as a critical technology for enterprise and cloud computing systems. Deploying workloads into virtual machines provides multiple benefits including fault isolation between consolidated workloads and improved manageability through features such as live migration.

Generally, it is desirable to consolidate numerous virtual machines onto physical servers for improved resource utilization and power efficiency. To accomplish consolidation of virtual machines onto a server, for example, memory and processing capabilities must be allocated amongst virtual machines on the server. With respect to memory management, one method for allocating memory to virtual machines is to provide static memory allotments to each virtual machine, where memory is allocated to each virtual machine conservatively based upon worst case usage of memory of the virtual machines. It can be ascertained, however, that this can severely limit the ability to consolidate virtual machines on the server. For example, resource requirements of virtual machines may fluctuate significantly over time.

Another mechanism for allocating memory is referred to as memory balancing. In memory balancing, a dynamic memory manager is utilized to cause memory to be dynamically allocated between virtual machines, such that when one virtual machine is experiencing low resource requirements, another can be provisioned with resources that meet high demand phases. Memory balancing can allow for improved consolidation of virtual machines by removing the need for conservatively allocating memory based on worst case scenarios. In conventional memory balancing techniques, however, second level paging is sometimes required when memory is overcommitted to virtual machines. That is, the virtual machines must write data to disk rather than writing data to memory, which may cause virtual machines to generate numerous faults, thereby negatively affecting performance of the server.

SUMMARY

The following is a brief summary of subject matter that is described in greater detail herein. This summary is not intended to be limiting as to the scope of the claims.

Described herein are various technologies pertaining to provisioning caches in virtualized servers, wherein such caches are opportunistic and include pages from virtual memories that are categorized as short-lived pages. Short-lived pages can be defined as pages that can unpredictably be re-allocated across virtual machines over a relatively small time frame. In contrast, long-lived memory can be defined as pages where availability of the memory is only affected by infrequent events such as hardware failures. Thus, an example of short-lived memory may be memory made available by way of content-based page sharing. With page sharing, identical pages utilized by child virtual machines can be backed by a single physical memory page, thereby providing additional free memory that can be allocated to other virtual machines. Another example of short-lived memory may be memory that is zeroed out by one or more virtual machines (e.g., a virtual machine indicates that it is not currently using such memory). In still yet another example, in disaggregated memory systems a server may temporarily expose idle memory to remote servers across the network. This temporarily exposed memory can be classified as short-lived memory, since it may be desirably utilized by a virtual machine with relatively little notice.

Therefore, memory can be categorized as being short-lived or long-lived, and an opportunistic cache can be provisioned that comprises short-lived memory. In an example, the cache is opportunistic in that when short-lived memory is available, such short-lived memory can be exploited to cache data for virtual machines executing on a server to reduce input/output overhead that corresponds to reading to and from disk. If no pages are available in the cache, the virtual machines can revert to conventional behavior. The cache described herein may be a "lossy" cache since data in a cache is destroyed when a short-lived page "dies." For example, if content-based page sharing is occurring between virtual machines and one of the virtual machines makes a write to such page, then a copy of the page must be generated and provided to the virtual machine. In this case, data in short-lived memory "dies," as the memory "created" through utilization of content-based page sharing is being requested by the virtual machine. Accordingly the cache described herein can be used by virtual machines in a write through manner so that, for instance, data can be retrieved from other storage locations such data is unable to be retrieved from the cache.

Pursuant to an example, the opportunistic cache can be based in a hypervisor executing on the server. Of course, other implementations are also contemplated. For example, a cache described herein may be managed at least in part by a root virtual machine, through separate control software in a child (guest) virtual machine, etc.

Other aspects will be appreciated upon reading and understanding the attached figures and description.

DETAILED DESCRIPTION

Figure 1:
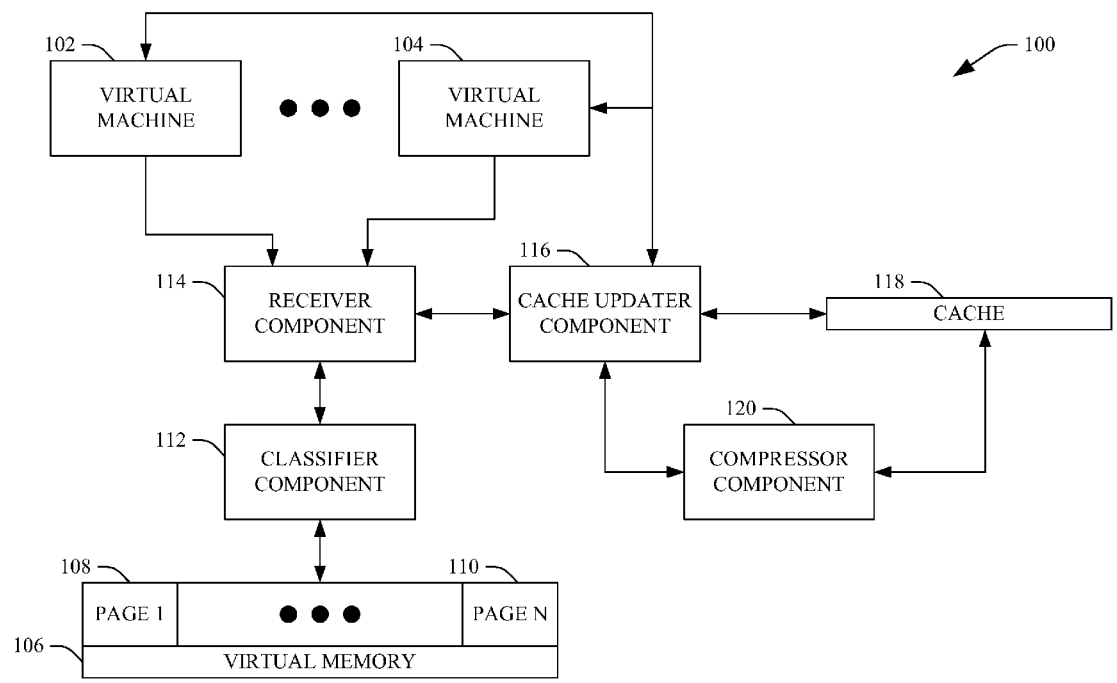
FIG. 1 is a functional block diagram of an example system that facilitates provisioning an opportunistic cache on a virtualized server through classification of virtual memory as being short-lived or long-lived.

Various technologies pertaining to provisioning an opportunistic cache on a virtualized server will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates provisioning an opportunistic cache through classification of virtual memory as being short-lived or long-lived is illustrated. The system 100 includes a plurality of virtual machines 102-104 that are executing on a computing device. As will be understood by one of ordinary skill in the art, a virtual machine is a software implementation of a computer that can execute instructions such as a real machine. Numerous virtual machines can execute on a single computing device, wherein including numerous virtual machines on a computing device can be referred to as consolidation. The virtual machines 102-104 may include, for example, a root virtual machine that is configured to manage execution of numerous child virtual machines (guests) on the computing device. Thus, the plurality of virtual machines 102-104 may also include one or more child virtual machines. In an embodiment, a server or data center may comprise the virtual machines 102-104. In another embodiment a personal computing device such as a desktop computer, a laptop computer, a mobile telephone, etc. may comprise the plurality of virtual machines 102-104.

The system 100 further comprises a virtual memory 106 that is accessible to the plurality of virtual machines 102-104. The virtual memory 106 comprises a plurality of pages 108-110, wherein a page is a block of virtual memory of a certain size. The virtual memory 106 is backed by physical memory (not shown). As indicated above, it is often desirable to allow multiple virtual machines to execute on a computing device. When multiple virtual machines are executing on a computing device, resources such as the virtual memory 106 are selectively allocated to the virtual machines 102-104 to allow for consolidation of such virtual machines 102-104. Because there are a finite number of pages in the virtual memory 106, the pages 108-110 in the virtual memory 106 are desirably allocated in such a manner that one or more of the virtual machines 102-104 executing on the computing device are not associated with second level paging. As described in detail below, pages in the virtual memory 106 can be classified as short-lived pages or long-lived pages, and pages classified as being short-lived can be utilized in a cache that is accessible to the virtual machines 102-104. As used herein, long-lived memory can refer to pages in the virtual memory 106 whose availability is affected by infrequent events such as hardware failures. Short-lived memory can refer to pages in the virtual memory 106 that can "disappear" from the system unpredictably across a relatively small time scale.

An example of short-lived memory is memory made available by way of content-based page sharing. In content-based page sharing, two or more virtual machines can share pages that comprise identical content. Thus, rather than dedicating one page that includes content to a first virtual machine and a second page with the same content to a second virtual machine, the pages with the identical content are shared amongst the virtual machines. If, however, one of the virtual machines writes to a page that is being shared with at least one other virtual machine, then the free memory previously made available needs to be provided to one of the virtual machines. Another example of short-lived memory may be idle memory in a disaggregated memory system. In still yet another example of short-lived memory, a virtual machine can zero out a page that has been allocated to such virtual machine. That is, the virtual machine can indicate that for the time being the virtual machine does not need such page (the virtual machine does not need the resources of the virtual memory allocated to such virtual machine). If, however, demand on the virtual machine increased, such virtual machine may need to quickly reacquire a zeroed out page.

The system 100 further comprises a classifier component 112 that can monitor the virtual memory 106 and/or activities of the virtual machines 102-104 to classify pages in the virtual memory as being short-lived or long-lived. The classifier component 112 may use any suitable technique for identifying pages in the virtual memory 106 that are short-lived. For instance, the classifier component 112 can scan threads output by one or more of the virtual machines 102-104 to detect shareable pages. In another example, the classifier component 112 can analyze contents of the virtual memory 106 to locate zeroed out pages. Thus, the classifier component 112 can use any suitable technique in connection with classifying pages of the virtual memory 106 as being short-lived or long-lived.

A receiver component 114 can be in communication with the classifier component 112 and can receive an indication that at least one page in the virtual memory 106 is free and that the at least one page in the virtual memory 106 is classified as short-lived memory.

The system 100 further comprises a cache updater component 116 that is in communication with the receiver component 114. The cache updater component 116 dynamically updates an opportunistic cache 118 to include one or more pages that have been classified by the classifier component 112 as being short-lived, wherein the cache 118 is accessible to the virtual machines 102-104. With more detail pertaining to the cache 118, such cache 118 can be a "lossy" cache since data in pages in the cache 118 can be destroyed when a short-lived page "dies." Therefore, the virtual machines 102-104 can employ the cache 118 in a write through manner such that, for example, data can be retrieved from another storage location if such data cannot be retrieved from the cache 118.

As will be described in greater detail below, the virtual machines 102-104 can be configured with functionality that allows such virtual machines 102-104 to write data to pages in the cache 118, read data from pages in the cache 118 and/or evict data from pages in the cache 118 by way of the cache updater component 116. Furthermore, the cache updater component 116 can remove virtual memory from the cache 118 if and when short-lived memory "dies." In an embodiment, the cache 118 can be a write-through cache, and pages from such cache can be repurposed in relatively short amounts of time without having to request return of such pages from the virtual machines 102-104 that are utilizing the cache 118. Thus, the cache 118 may be restricted to including pages whose contents can be recreated by the virtual machine that submitted one or more pages to the cache. In an example, clean pages from a file system can be stored in the cache 118, pages written to a pagefile can be stored in the cache 118, or data that can be computationally regenerated can be stored in the cache 118. Therefore, the cache 118 can appear to operating systems in child virtual machines utilizing the cache as a write-through cache of indeterminate size. Techniques pertaining to utilizing the cache 118 (reading to the cache, writing to the cache, evicting data from the cache) will be described in greater detail below.

The system 100 may further optionally include a compressor component 120 that can compress data written to the cache 118 by one or more of the virtual machines 102-104 by way of the cache updater component 116 for additional savings in memory. The compressor component 120 may utilize any suitable compression technique when compressing data to be placed in the cache 118. Additionally, the compressor component 120 can comprise decompression algorithms to decompress data read from the cache 118 by one or more virtual machines 102-104. Pursuant to an example, the compressor component 120 can selectively compress data written to the cache 118 based upon a predicted frequency of access of the data in the cache 118. Therefore, data that is predicted to be accessed frequently may be placed in the cache 118 in an uncompressed manner while data in the cache 118 that is predicted to be accessed less frequently can be compressed by the compressor component 120.

Figure 2:
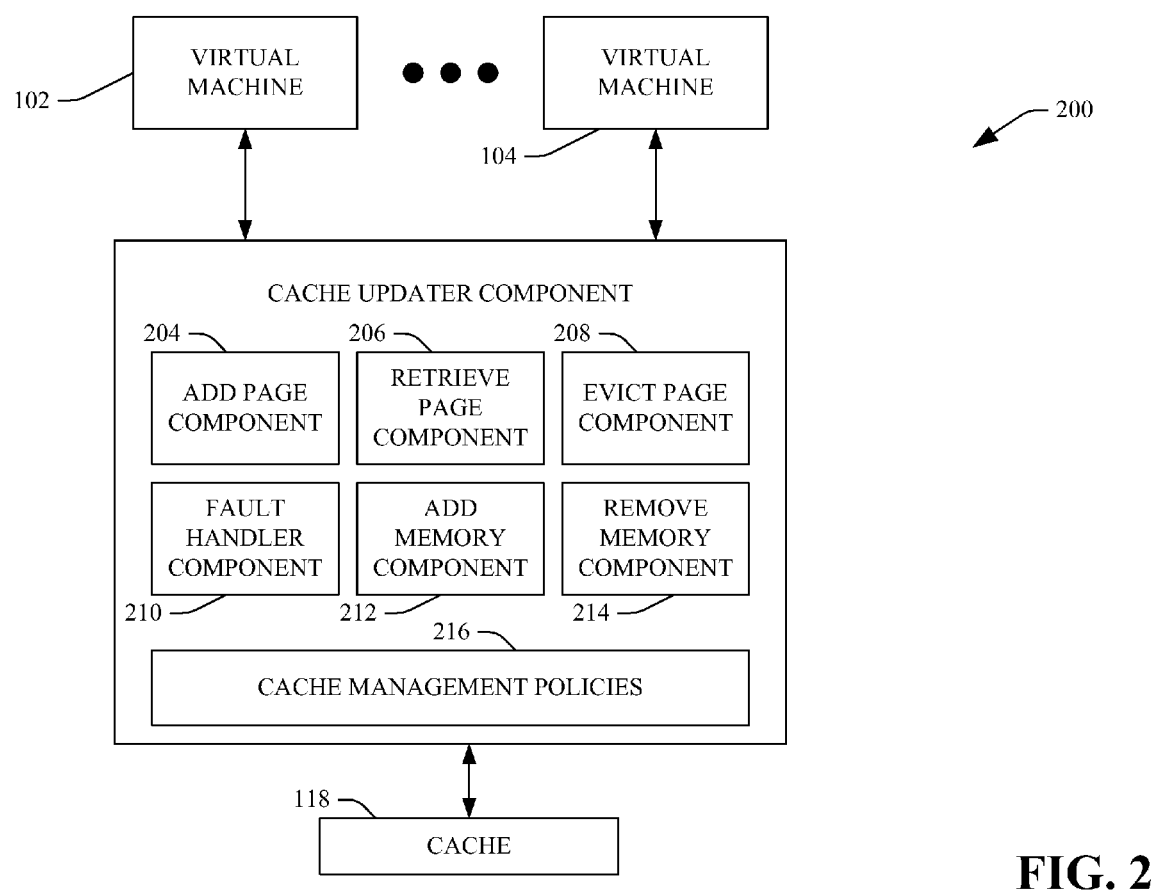
FIG. 2 is a functional block diagram of an example system that facilitates managing an opportunistic cache on a virtualized server.

With reference now to FIG. 2, an example system 200 that facilitates provisioning of an opportunistic cache based at least in part upon classification of pages of virtual memory as being short-lived is illustrated. The system 200 comprises the plurality of virtual machines 102-104 that access the cache 118 by way of the cache updater component 116. In an embodiment, the cache updater component 116 may be included in a hypervisor executing on the computing device. In another example, the cache updater component 116 may be included in a root virtual machine that is in communication with the hypervisor. In yet another embodiment, portions of the cache updater component 116 may be distributed between the hypervisor, the root virtual machine, and/or one or more child virtual machines.

The cache updater component 116 can comprise a plurality of components that facilitate utilization of such cache 118 by the virtual machines 102-104. Components described as being in the cache updater component 116 may be configured to ensure that there are no data persistency issues with respect to the cache 118, such that a thread from one virtual machine is not submitting an update to a certain portion of the cache 118 while another thread is reading from the certain portion of the cache 118. Thus, the cache updater component 116 can be configured to handle race conditions and other suitable issues.

While the components are shown as being included in the cache updater component 116, it is to be understood that callers to the cache 118 may be expected to handle certain error conditions. Specifically, the virtual machines 102-104 may be configured with components that correspond to the components shown in the cache updater component 116. Pursuant to an example, these components may be application programming interfaces (APIs) that are configured to add, retrieve and evict pages from the cache 118. Specifically, the virtual machines 102-104 can be configured with APIs that allow such virtual machines 102-104 to request that data be written to, read from, and/or evicted from the cache. Furthermore, the virtual machines 102-104 can be configured with functionality for handling errors. For instance, in some cases the cache updater component 116 may fail to add a page to the cache as requested by one of the virtual machines 102-104. In another example, the cache updater component 116 may fail to obtain a page from the cache 118 even though the page was previously added successfully to the cache 118. The virtual machines 102-104 can be equipped with interfaces (APIs) to handle such failures. Through such interfaces the cache 118 can be utilized to cache any data that can be recreated if a retrieve operation fails. Thus, for example, the cache updater component 116 can be employed to cache data written to a pagefile by one of the virtual machines 102-104. For instance, when a server is under memory pressure, a dynamic memory manager may have little flexibility to manage resources and guests may be likely to page out data to a page file. To handle the error cases outlined above (failure to add data to a cache, or failure to obtain data from the cache 118), the virtual machines 102-104 can be configured to write contents of a page to the pagefile prior to adding the contents of the page to the cache 118. Similarly, when a page is desirably read in from the pagefile, the virtual machines 102-104 can issue an input/output request to the pagefile only if the page was not previously added to the cache 118 or could not be retrieved from the cache 118. Further, the virtual machines 102-104 can be configured to evict pages from the cache 118 if desired.

The cache updater component 116 may be configured to handle calls to add data to, retrieve data from, or evict data from the cache 118 from the virtual machines 102-104. Specifically, the cache updater component 116 may comprise an add page component 204. If the cache updater component 116 receives a request to add a page to the cache 118 from one of the virtual machines 102-104, the add page component 204 can cause such data to be placed in the cache 118. Specifically, in an example, the cache updater component 116 retrieve data that is desirably added to the cache 118 by the virtual machine that generated the request to add the data to the cache 118. In a particular example, a virtual machine may output a page write request that includes data that can be utilized to allow an API to complete a request asynchronously or synchronously and identifies a page or pages that are to be copied and placed in the cache 118. This data can also be utilized in page read requests and/or evict page requests to identify a page or plurality of pages to be read from the cache 118 or evicted from the cache 118 synchronously or asynchronously.

The cache updater component 116 may further comprise a retrieve page component 206 that can be utilized to retrieve data from the cache 118 and provide such data to a virtual machine that is requesting the data. Specifically, a virtual machine can generate a request to read data from the cache 118, wherein the request comprises a key and a completion context. The retrieve page component 206 may then access the cache 118 and provide the calling virtual machine with the requested data.

The cache updater component 116 may also include an evict page component 208 that is configured to receive a request to evict data from the cache 118 from one or more of the virtual machines 102-104 and cause such data to be evicted from the cache 118. For example, a virtual machine may initiate a page evict command, wherein such command includes a key and a number of pages to be evicted from the cache 118. The evict page component 208 may access the cache 118 and evict pages that correspond to the key submitted by the virtual machine.

Using the add page component 204, the retrieve page component 206 and the evict page component 208 (and corresponding components in the virtual machines 102-104), a virtual machine can utilize the cache 118 to cache data that can be recreated if a retrieve data request fails. With the components 204-208 described above, an operating system executing in one of the virtual machines can use the cache 118 to cache page file data. The cache updater component 116 further comprises a fault handler component 210 that can handle faults caused by, for instance, a virtual machine attempting to write to a shared page in virtual memory. When the virtual machine attempts to write to the shared page, a fault is generated and received by the fault handler component 210. The fault may be generated, for instance, by a root virtual machine or a child virtual machine. The fault handler component 210 can access the cache 118 and repurpose a page in the cache 118, generate a copy of contents of such page that was attempted to be written to by the virtual machine, and provide such copy to the (faulting) virtual machine. While handling the fault, the fault handler component 210 need not request memory from a guest virtual machine but can instead simply repurpose one or more pages in the cache 118.

The cache updater component 116 may additionally include an add memory component 212 that can add pages to the cache 118 if pages in virtual memory are identified as short-lived by the classifier component 112 (FIG. 1). In other words, when additional short-lived memory is added to the system, the add memory component 212 can increase the size of the cache 118 by adding the short-lived memory to such cache 118. Conversely, the cache updater component 116 can include a remove memory component 214 that can be configured to remove memory from the cache 118 if short-lived memory "dies" in the system. That is, if short-lived memory disappears from the system, the removed memory component 214 can reduce the size of the cache 118 by removing pages therefrom. Since the cache 118 can operate as a write through cache, no data is permanently lost.

The cache updater component 116 can further include cache management policies 216. Such policies 216 can include details pertaining to how the cache 118 is to be shared between multiple virtual machines and how portions of the cache 118 pertaining to a certain virtual machine are to be managed. The cache management policies 216 can include priority data that indicates which virtual machine has priority to certain portions of the cache amongst other virtual machines.

Figure 3:
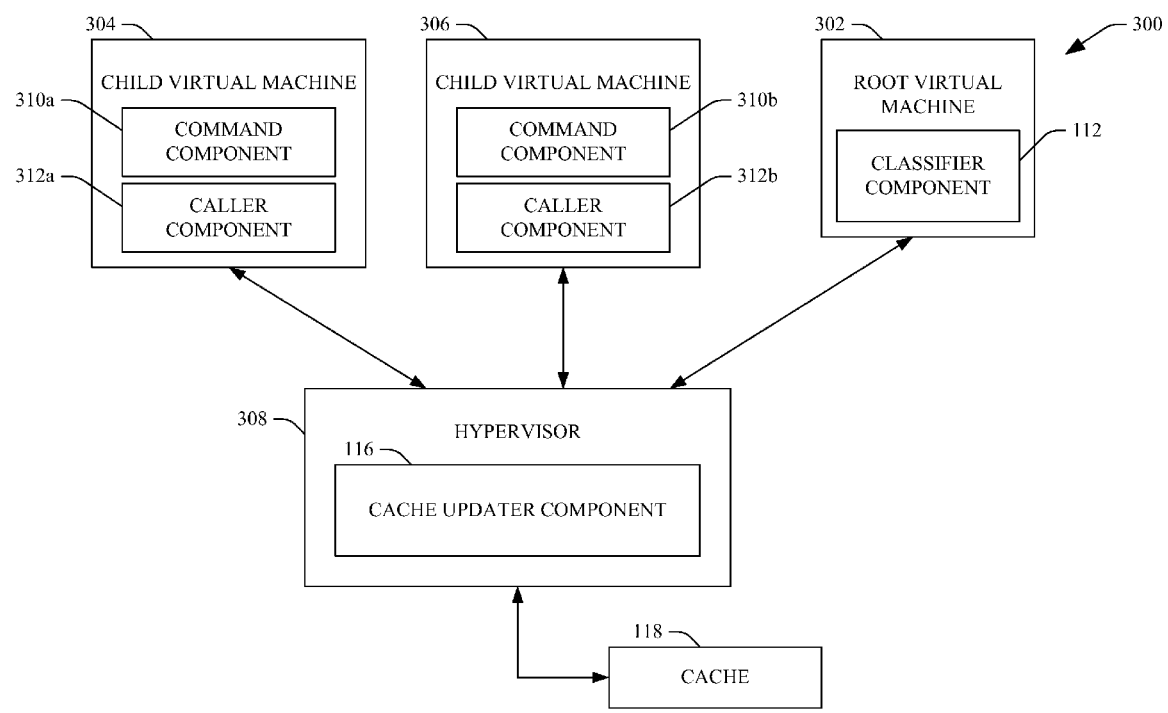
FIG. 3 is a functional block diagram of an example system that facilitates a hypervisor-based opportunistic cache on a virtualized server.

Referring now to FIG. 3, an example system 300 that facilitates provisioning an opportunistic cache through classification of memory as being short-lived or long-lived is illustrated. The system 300 comprises a root virtual machine 302 executing on a computing device such as a server. The root virtual machine 302 can act as a manager or a control program with respect to child virtual machines. The system 300 further comprises a plurality of child virtual machines 304-306 that are executing on the computing device and are managed by the root virtual machine 302. A hypervisor 308 acts as a module that allows virtualization to occur on the computing device. In this example embodiment, the cache updater component 116 is included in the hypervisor 308. As indicated above, the cache updater component 116 can be utilized in connection with controlling access to the cache 118.

In this example embodiment, the root virtual machine 302 comprises the classifier component 112. Thus, the root virtual machine 302 can be configured to move short-lived memory to and from the cache 118 by way of the hypervisor 308. Specifically, the classifier component 112 can detect that page sharing is occurring between the child virtual machines 304-306 and can output an indication that memory can be added to the cache 118. The hypervisor 308 can receive such indication and the cache updater component 116 can add memory to the cache 118.

Each of the child virtual machines 304-306 can comprise a command component 310. Pursuant to an example, the command component 310 can be or include an interface (API) that allows the child virtual machines 304-306 to output requests to write to a page in the cache 118, read from a page in the cache 118 or evict pages from the cache 118. For example, the command component 310 can be configured with APIs that allow the child virtual machines 304-306 to generate such commands.

Each of the child virtual machines 304-306 may also comprise a caller component 312. The caller component 312 can be configured to generate hypercalls that are to be transmitted to the hypervisor 308, wherein such hypercalls are initiated upon the command component 310 offering an indication that the child virtual machines 304-306 wish to write to, read from, or evict data from the cache 118.

As indicated above, the hypervisor 308 can comprise the cache updater component 116. The hypervisor 308 can be configured to support hypercalls to add and remove memory from the cache 118 and to support read, write and evict operations on the data cached in the cache 118. In an example, when memory freed from page sharing is submitted to the cache updater component 116, the hypervisor 308 can be configured to handle a fault incurred by a guest operating system executing in a virtual machine by repurposing a page from the cache 118 to provide a copy to the faulting child virtual machine.

It is to be understood that the embodiment shown in FIG. 3 is an exemplary embodiment and other configurations are contemplated by the inventors and are intended to fall under the scope of the hereto appended claims. For example, portions of the cache updater component 116 may be included in the root virtual machine 302 and/or in the child virtual machines 304-306. In another example, the classifier component 112 may be included in the hypervisor 308 and/or distributed across child virtual machines 304-306.

Figure 4:
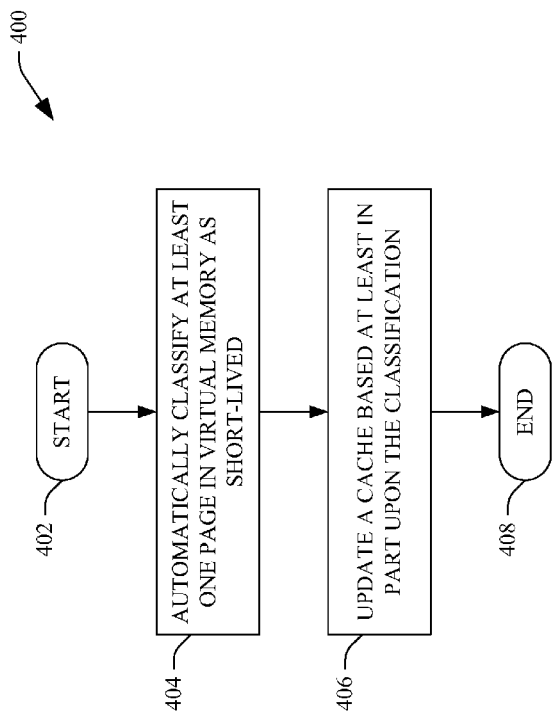
FIG. 4 is a flow diagram that illustrates an example methodology for updating a cache in a virtualized server based at least in part upon a classification of virtual memory as being short-lived or long-lived.
Figure 5:
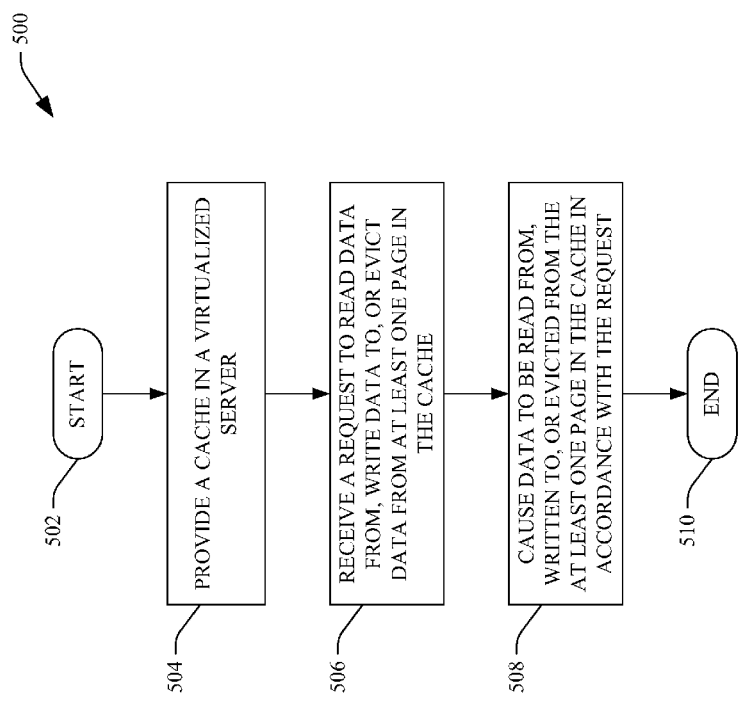
FIG. 5 is a flow diagram that illustrates an example methodology for causing data to be read from, written to, or evicted from at least one page in an opportunistic cache on a virtualized server.

With reference now to FIGS. 4-5, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 4, a methodology 400 that facilitates updating an opportunistic cache based at least in part upon a characterization of virtual memory as being short-lived is illustrated. The methodology 400 begins at 402, and at 404 at least one page in virtual memory is classified as being short-lived. For example, the virtual memory may be resident on a computing device that executes at least one virtual machine, wherein the virtual memory is accessible to the virtual machine.

At 406, a cache is dynamically updated based at least in part upon the characterization of the at least one page in the virtual memory as being short-lived memory. The virtual machine may then utilize the cache by writing data to the cache, reading data from the cache, and/or evicting data from the cache. The methodology 400 completes at 408.

Turning now to FIG. 5, the example methodology 500 that facilitates causing data to be read from, written to or evicted from a cache is illustrated. The methodology 500 starts at 502, and at 504 an opportunistic cache is provided in a virtual server. As described above, the opportunistic cache comprises pages that are deemed to be short-lived pages (e.g., pages that are freed due to page sharing by virtual machines that are executing on a computing device).

At 506, a request to read data from, write data to or evict data from at least one page in the cache is received from a child virtual machine that desirably utilizes the cache. At 508, data is caused to be read from, written to or evicted from the at least one page in the cache in accordance with the request generated by the child virtual machine (a guest operating system executing in the child virtual machine). The methodology 500 completes at 510.

Figure 6:
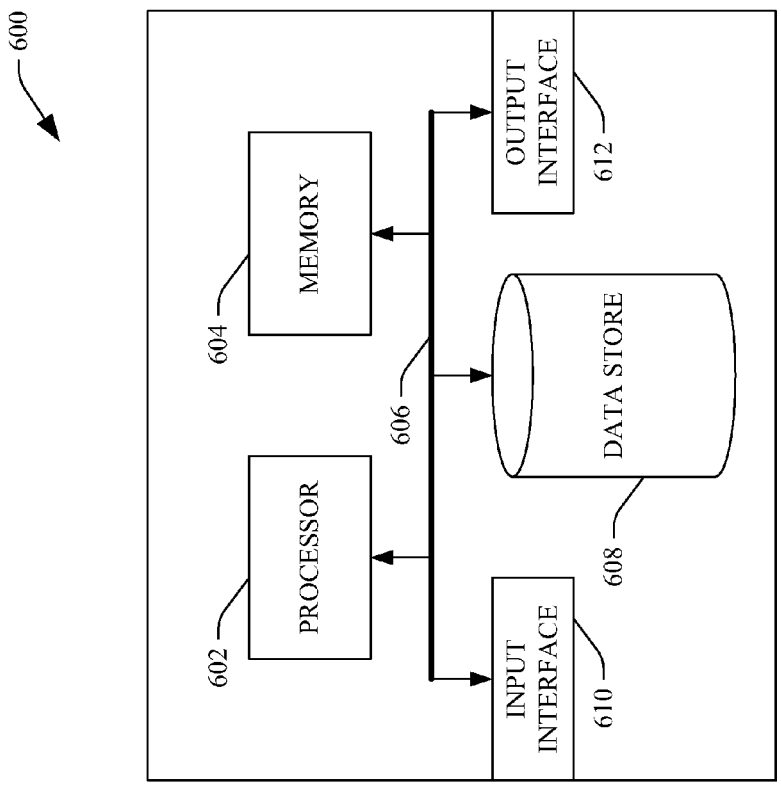
FIG. 6 is an example computing system.

Now referring to FIG. 6, a high-level illustration of an example computing device 600 that can be used in accordance with the systems and methodologies disclosed herein is illustrated. For instance, the computing device 600 may be used in a system that supports provisioning an opportunistic cache in a server that includes a plurality of virtual machines, wherein the opportunistic cache is made up of short-lived memory. In another example, at least a portion of the computing device 600 may be used in a system that supports writing data to, reading data from, or evicting data from the aforementioned cache. The computing device 600 includes at least one processor 602 that executes instructions that are stored in a memory 604. The memory 604 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store page file data, for example.

The computing device 600 additionally includes a data store 608 that is accessible by the processor 602 by way of the system bus 606. The data store 608 may be or include any suitable computer-readable storage, including a hard disk, memory, DVD, CD, etc. The data store 608 may include executable instructions, page files that are to be copied to the cache, etc. The computing device 600 also includes an input interface 610 that allows external devices to communicate with the computing device 600. For instance, the input interface 610 may be used to receive instructions from an external computer device, from an individual, etc. The computing device 600 also includes an output interface 612 that interfaces the computing device 600 with one or more external devices. For example, the computing device 600 may display text, images, etc. by way of the output interface 612.

Additionally, while illustrated as a single system, it is to be understood that the computing device 600 may be a distributed system. Thus, for instance, several devices may be in communication by way of a network connection and may collectively perform tasks described as being performed by the computing device 600.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
   in a computing device executing a plurality of virtual machines that access virtual memory in the computing device, characterizing a page in the virtual memory as being short-lived memory rather than long-lived memory, the page allocated to a virtual machine in the plurality of virtual machines, wherein the characterizing of the page in the virtual memory as being short-lived memory rather than long-lived memory is based upon the page becoming free by way of content-based sharing between the virtual machine and a second virtual machine in the plurality of virtual machines;
   dynamically updating a cache to comprise the page based at least in part upon the characterization of the page in the virtual memory as being short-lived memory rather than long-lived memory, wherein the cache is accessible to the plurality of virtual machines; and
   responsive to receiving an indication that the virtual machine has requested a write to a shared page between the two virtual machines, re-allocating the page to the virtual machine.

2. The method of claim 1, wherein the plurality of virtual machines are executing in the computing device, and wherein the cache is accessible to each virtual machine in the plurality of virtual machines.

3. The method of claim 1, further comprising:
   determining that a second page in the virtual memory is marked as a zeroed out page by at least one virtual machine in the plurality of virtual machines; and
   characterizing the second page in the virtual memory as being short-lived memory rather than long-lived memory based at least in part upon determining that the second page in the virtual memory is marked as a zeroed out page by the at least one virtual machine.

4. The method of claim 1, wherein the computing device is included in a data center that executes the plurality of virtual machines.

5. The method of claim 1, wherein a root virtual machine detects that the page has become free.

6. The method of claim 1
   wherein re-allocating the page to the virtual machine comprises:
      removing at least one page from the cache;
      copying content of the shared page to the at least one page; and
      allocating the at least one page to the virtual machine, the at least one page being the re-allocated page.

7. The method of claim 6, wherein a hypervisor performs the acts of receiving, removing, copying, and allocating.

8. The method of claim 1, wherein a child virtual machine is configured to generate calls to write data to, read data from, or evict data from the cache.

9. The method of claim 8, wherein a hypervisor receives the calls to write data to, read data from, or evict data from the cache and is configured to retrieve data and copy data to the cache, read data from the cache and provide data to the child virtual machine, or evict data from the cache, respectively.

10. The method of claim 1, wherein a hypervisor performs the characterizing and updating.

11. The method of claim 1, further comprising:
    receiving, from a third virtual machine in the plurality of virtual machines, a write of content to the page when the page is in the cache; and
    writing the content to a secondary storage device responsive to writing the content to the page in the cache.

12. A system comprising:
    a processor; and
    memory comprising a plurality of components that are executed by the processor, the plurality of components comprising:

a classifier component that classifies a page in virtual memory as being short-lived memory rather than long-lived memory based upon the page becoming free due to page sharing between a first virtual machine and a second virtual machine in a plurality of virtual machines; and a cache updater component that dynamically updates a cache to include the page based upon the classifier component classifying the page as being short-lived memory rather than long-lived memory, the cache is accessible to a plurality of virtual machines, the cache acts as a write-through cache, such that content written to the page by a virtual machine in the plurality of virtual machines while included in the cache is also written to a secondary storage device.

13. The system of claim 12, wherein a server comprises the classifier component and the cache updater component.

14. The system of claim 13, wherein the classifier component classifies a second page as being long-lived memory, and the cache updater component fails to include the second page in the cache based upon the classifier component classifying the second page as being long-lived memory.

15. The system of claim 12, wherein the classifier component classifies a second page as being short-lived memory based upon a determination that the second page has been marked as zeroed out by a child virtual machine.

16. The system of claim 12, the plurality of components further comprising a compressor component that compresses data to be placed in the cache by a virtual machine in the plurality of virtual machines.

17. The system of claim 12, wherein a hypervisor comprises the cache updater component.

18. The system of claim 12, wherein size of the cache changes dynamically.

19. A computing device comprising a computer-readable medium, the computer-readable medium comprising instructions that, when executed by a processor, cause the processor to perform acts comprising:

providing a cache in a virtualized server, wherein size of the cache is dynamic and is based at least in part upon a classification of pages of memory as being short-lived rather than long-lived, at least one page in the pages classified as being short-lived based upon the at least one page being free due to page sharing between two virtual machines in a plurality of virtual machines, the at least one page included in the cache;

receiving an indication that a first virtual machine in the two virtual machines has requested a write to a page that is shared between the two virtual machines; and responsive to receiving the indication, allocating the at least one page to the first virtual machine.

20. The computing device of claim 19, wherein allocating the at least one page to the first virtual machine comprises:

removing the at least one page from the cache; and copying content of the page that is shared between the two virtual machines to the at least one page.

* * * * *